US012461643B2

(12) United States Patent
Wu

(10) Patent No.: US 12,461,643 B2
(45) Date of Patent: Nov. 4, 2025

(54) APPLICATION NOTIFICATION DISPLAY METHOD AND APPARATUS, AND ELECTRONIC DEVICE

(71) Applicant: VIVO MOBILE COMMUNICATION CO., LTD., Guangdong (CN)

(72) Inventor: Yuchen Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 182 days.

(21) Appl. No.: 18/405,898

(22) Filed: Jan. 5, 2024

(65) Prior Publication Data

US 2024/0143127 A1    May 2, 2024

Related U.S. Application Data

(63) Continuation of application No. PCT/CN2022/105338, filed on Jul. 13, 2022.

(30) Foreign Application Priority Data

Jul. 16, 2021 (CN) .......................... 202110805067.2

(51) Int. Cl.
  *G06F 3/04817*    (2022.01)
(52) U.S. Cl.
  CPC .................. *G06F 3/04817* (2013.01)
(58) Field of Classification Search
  CPC .................................................. G06F 3/04817
  USPC ........................................................ 715/835
  See application file for complete search history.

(56) References Cited

U.S. PATENT DOCUMENTS

| 8,214,768 B2 * | 7/2012 | Boule ................. G06F 3/04883 |
| | | 715/863 |
| 9,141,260 B2 * | 9/2015 | McCann ............... G06F 3/0486 |
| 10,382,401 B1 * | 8/2019 | Lee ........................ H04L 63/166 |
| 12,061,785 B2 * | 8/2024 | Lee ........................ G06F 1/1652 |
| 2012/0311493 A1 * | 12/2012 | Sohn .................... H04M 1/7243 |
| | | 715/808 |
| 2014/0351744 A1 * | 11/2014 | Jeon .................. H04M 1/72448 |
| | | 715/781 |
| 2016/0041719 A1 * | 2/2016 | Wang .................... G06F 3/0482 |
| | | 715/835 |
| 2016/0232197 A1 * | 8/2016 | Vaquero Gonzalez ....... |
| | | G06F 12/0284 |
| 2016/0300164 A1 * | 10/2016 | Dailly ................... G06F 3/0481 |

(Continued)

FOREIGN PATENT DOCUMENTS

| CN | 103677521 A | 3/2014 | |
| CN | 106155478 A * | 11/2016 | ......... G06F 3/04847 |

(Continued)

*Primary Examiner* — Reza Nabi
(74) *Attorney, Agent, or Firm* — Price Heneveld LLP

(57) ABSTRACT

This application discloses an application notification display method and apparatus, and an electronic device, and belongs to the field of communication technologies. The method includes: displaying a first icon in a first region; and displaying a second icon in a second region, where the first region is close to the second region; and the display position of the second icon is updated or display of the second icon is canceled in a case of receiving the first notification corresponding to the first application, the first notification is displayed in the third region, where the third region includes the first region and the second region, where the first icon corresponds to the first application.

13 Claims, 9 Drawing Sheets

(56) References Cited

U.S. PATENT DOCUMENTS

| | | | | |
|---|---|---|---|---|
| 2017/0102855 A1* | 4/2017 | Kwon | ................. | G06F 3/04847 |
| 2017/0116958 A1* | 4/2017 | Chen | ....................... | G09G 5/14 |
| 2018/0088750 A1* | 3/2018 | Ponson | ................. | G06F 3/0414 |
| 2019/0073113 A1* | 3/2019 | Yang | ................... | G06F 3/04886 |
| 2020/0117350 A1* | 4/2020 | Zhu | ......................... | G06F 9/451 |
| 2022/0084483 A1* | 3/2022 | Lawrence | ................ | G09G 5/14 |
| 2023/0343200 A1* | 10/2023 | Carrigan | ................ | G06F 3/011 |
| 2024/0062640 A1* | 2/2024 | Carrigan | ............. | G06F 3/04817 |
| 2024/0143127 A1* | 5/2024 | Wu | ...................... | G06F 3/0482 |
| 2024/0231592 A1* | 7/2024 | Markiewicz | ........ | G06F 3/04842 |

FOREIGN PATENT DOCUMENTS

| | | | | |
|---|---|---|---|---|
| CN | 106339231 A | * | 1/2017 | ......... G06F 3/04817 |
| CN | 107734172 A | | 2/2018 | |
| CN | 107766110 A | | 3/2018 | |
| CN | 107861784 A | | 3/2018 | |
| CN | 113407290 A | | 9/2021 | |

* cited by examiner

APPLICATION NOTIFICATION DISPLAY METHOD AND APPARATUS, AND ELECTRONIC DEVICE

CROSS-REFERENCE TO RELATED APPLICATIONS

This application is a Bypass Continuation Application of PCT International Application No. PCT/CN2022/105338 filed on Jul. 13, 2022, which claims priority to Chinese Patent Application No. 202110805067.2, filed with the China National Intellectual Property Administration on Jul. 16, 2021 and entitled "APPLICATION NOTIFICATION DISPLAY METHOD AND APPARATUS, AND ELECTRONIC DEVICE", which is incorporated herein by reference in its entirety.

TECHNICAL FIELD

This application belongs to the field of communication technologies, and specifically, to an application notification display method and apparatus, and an electronic device.

BACKGROUND

In the related art, when an application on an electronic device receives a notification message, a badge is usually displayed on an icon of the application on a desktop, but the badge can only remind a user of a number of notification messages of the application, but cannot display content of the notification messages, and the user can learn specific content of the notification only by tapping the icon of the application to enter the application. In a case that cumulatively a lot of applications receive notification messages, it is very troublesome for the user to operate. It can be learned that the desktop notification display effect of the existing application is poor.

SUMMARY

According to a first aspect, an embodiment of this application provides an application notification display method. The method includes:
displaying a first icon in a first region; and displaying a second icon in a second region, where the first region is close to the second region; and
updating a display position of the second icon or canceling display of the second icon in a case of receiving a first notification corresponding to a first application, and displaying the first notification in a third region, where the third region includes the first region and the second region, where
the first icon corresponds to the first application.

According to a second aspect, an embodiment of this application provides an application notification display apparatus, including:
a first display module, configured to display a first icon in a first region, and display a second icon in a second region, where the first region is close to the second region; and
a second display module, configured to update a display position of the second icon or cancel display of the second icon in a case of receiving a first notification corresponding to a first application, and display the first notification in a third region, where the third region includes the first region and the second region, where the first icon corresponds to the first application.

According to a third aspect, an embodiment of this application provides an electronic device. The electronic device includes a processor, a memory, and a program or instructions stored in the memory and runnable on the processor, the program or the instructions, when executed by the processor, implementing steps of the application notification display method according to the first aspect.

According to a fourth aspect, an embodiment of this application provides a readable storage medium. The readable storage medium stores a program or instructions, the program or the instructions, when executed by a processor, implementing steps of the application notification display method according to the first aspect.

According to a fifth aspect, an embodiment of this application provides a chip. The chip includes a processor and a communication interface, the communication interface is coupled to the processor, and the processor is configured to run a program or instructions, to implement the application notification display method according to the first aspect.

DETAILED DESCRIPTION

The following clearly and completely describes technical solutions in embodiments of this application with reference to accompanying drawings in the embodiments of this application. Apparently, the described embodiments are some of the embodiments of this application rather than all of the embodiments. All other embodiments obtained by a person of ordinary skill in the art based on the embodiments of this application shall fall within the protection scope of this application.

In the specification and claims of this application, terms "first", "second", and the like are used to distinguish similar objects, but do not indicate a particular sequence or order. It may be understood that terms used in such a way is interchangeable in proper circumstances, so that the embodiments of this application described herein can be implemented in other sequences than the sequence illustrated or described herein. The objects distinguished by "first", "second", and the like are usually of one type, and a number of objects is not limited, for example, a first object may be one or more than one object. In addition, "and/or" in the specification and claims represents at least one of connected objects, and a character "/" generally indicates that the connected objects are in an "or" relationship.

An application notification display method provided in the embodiments of this application is described below in detail through specific embodiments and application scenarios thereof with reference to the accompanying drawings.

Figure 1:
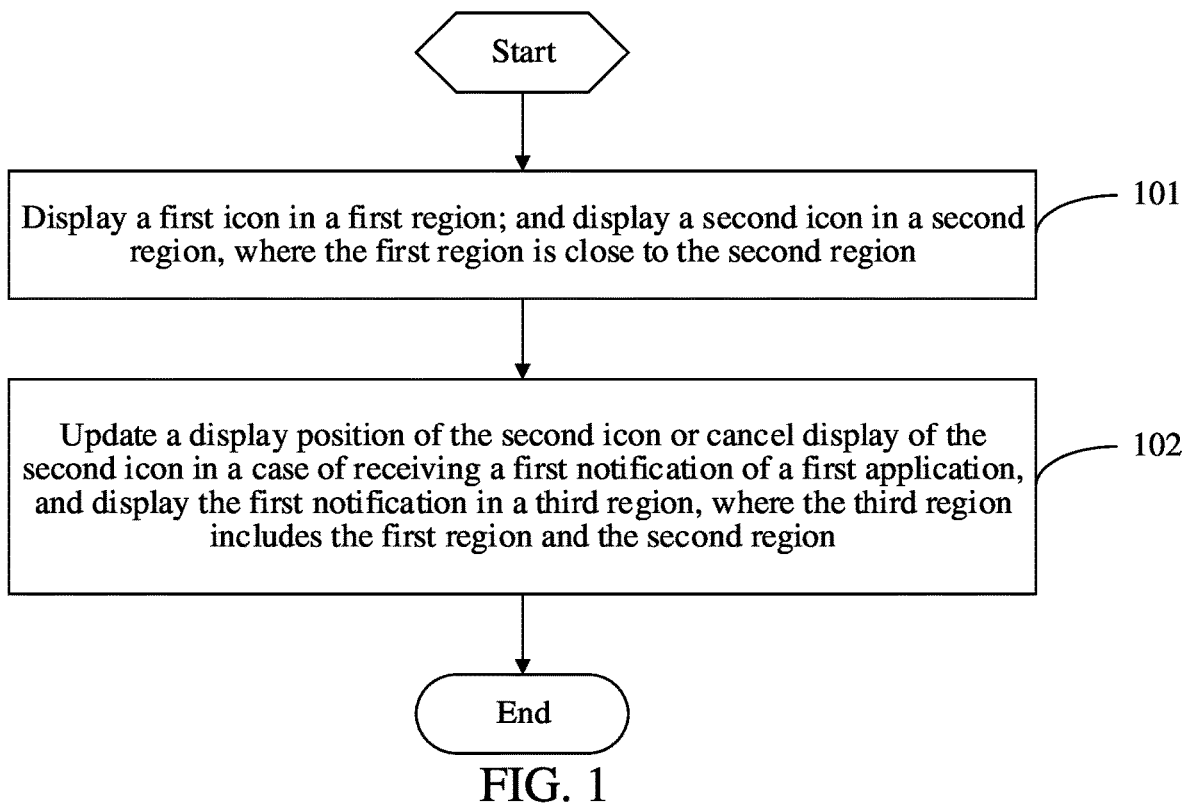
FIG. 1 is a flowchart of an application notification display method according to an embodiment of this application.

Refer to FIG. 1. FIG. 1 is a flowchart of an application notification display method according to an embodiment of this application. As shown in FIG. 1, the method includes the following steps.

Step 101: Display a first icon in a first region; and display a second icon in a second region, where the first region is close to the second region.

In this embodiment of this application, to enable a user to view notifications of applications on a desktop in time, for an application that currently receives an application notification on the desktop, a notification display region may be directly expanded at a display position of an icon of the application, and the application notification of the application is displayed in the notification display region.

The first icon may be any application icon or application folder icon on the desktop, the first region may be a display region of the first icon on the desktop, the second icon may be one or more icons on the desktop adjacent to the first icon or located close to the first icon, and the second region may be a display region of the second icon on the desktop. In other words, in a normal case, the first icon is displayed in the first region on the desktop, and the second icon is displayed in the second region close to the first region.

Step 102: Update a display position of the second icon or cancel display of the second icon in a case of receiving a first notification of a first application, and display the first notification in a third region, where the third region includes the first region and the second region, where the first icon corresponds to the first application.

That the first icon corresponds to the first application may indicate that the first icon is an application icon of the first application, or the first icon is an application folder icon of an application folder including an application icon of the first application, that is, the first application is an application of an application icon in an application folder of an application folder icon.

In this embodiment of this application, in a case that the first application corresponding to the first icon receives the first notification, a larger region used for displaying the first notification may be generated at a display position of an application icon, and a larger notification display region may be synthesized by using the second region. In other words, the first region and the second region may be merged to obtain the third region, and the first notification of the first application is displayed in the third region. In this way, the user can directly view notification content of the application on the desktop. The application icon of the first application, that is, the first icon, may also be displayed in the third region, to notify the user that the first notification is a notification of the first application.

Figure 2A:
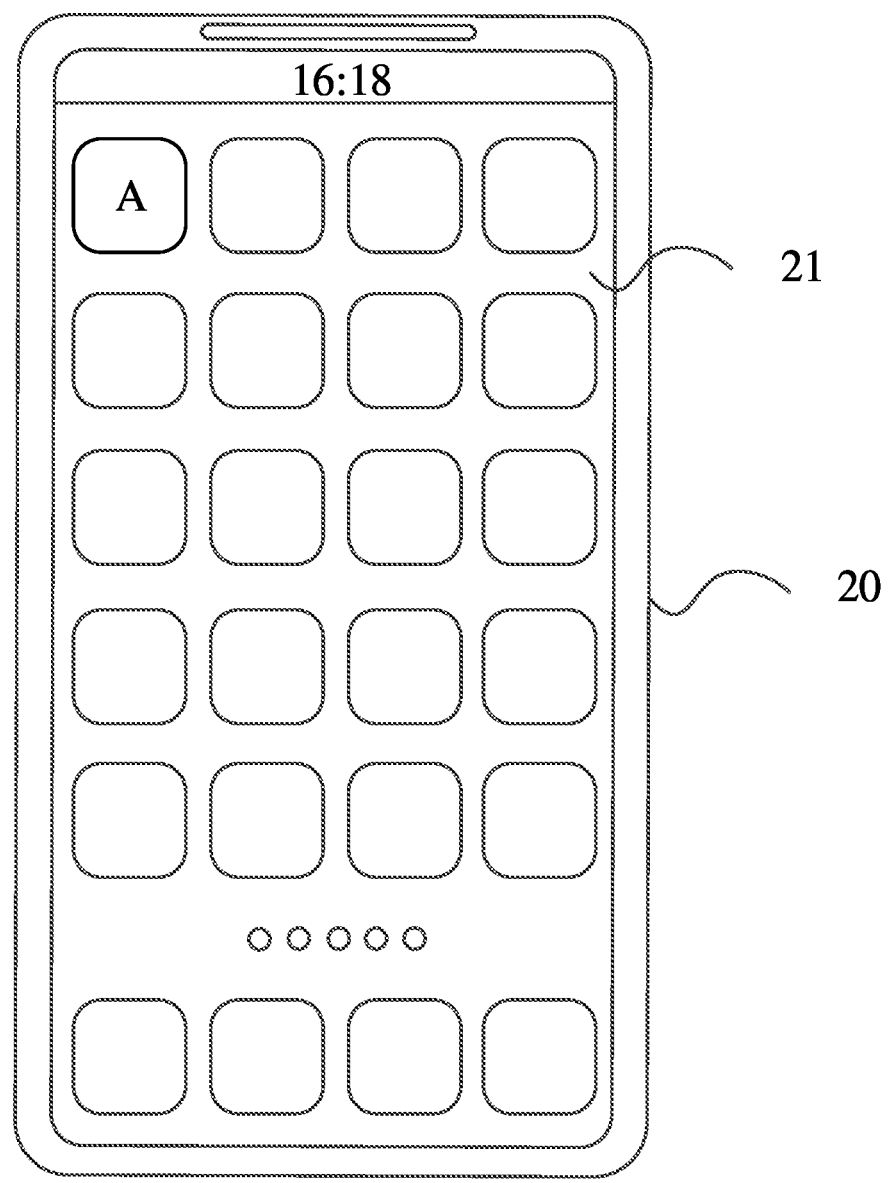
FIG. 2a is a schematic diagram of a desktop according to an embodiment of this application.
Figure 2B:
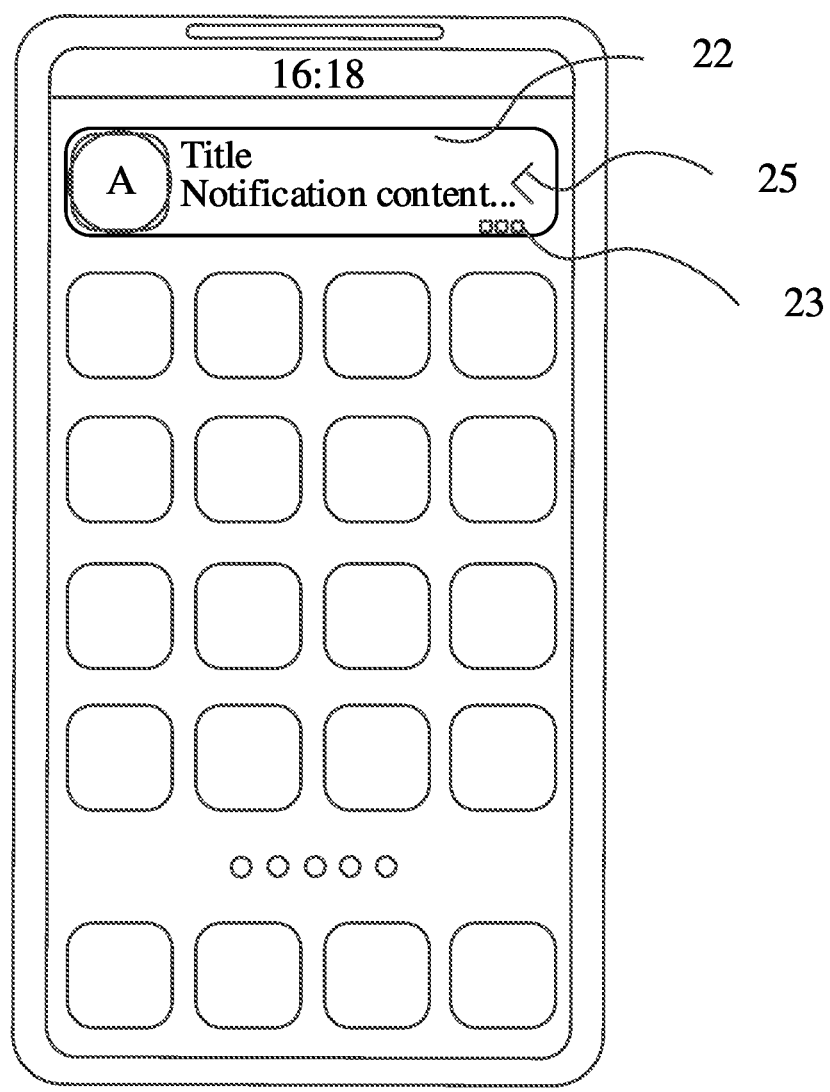
FIG. 2b is a schematic diagram 1 of displaying an application notification on a desktop according to an embodiment of this application.
Figure 2C:
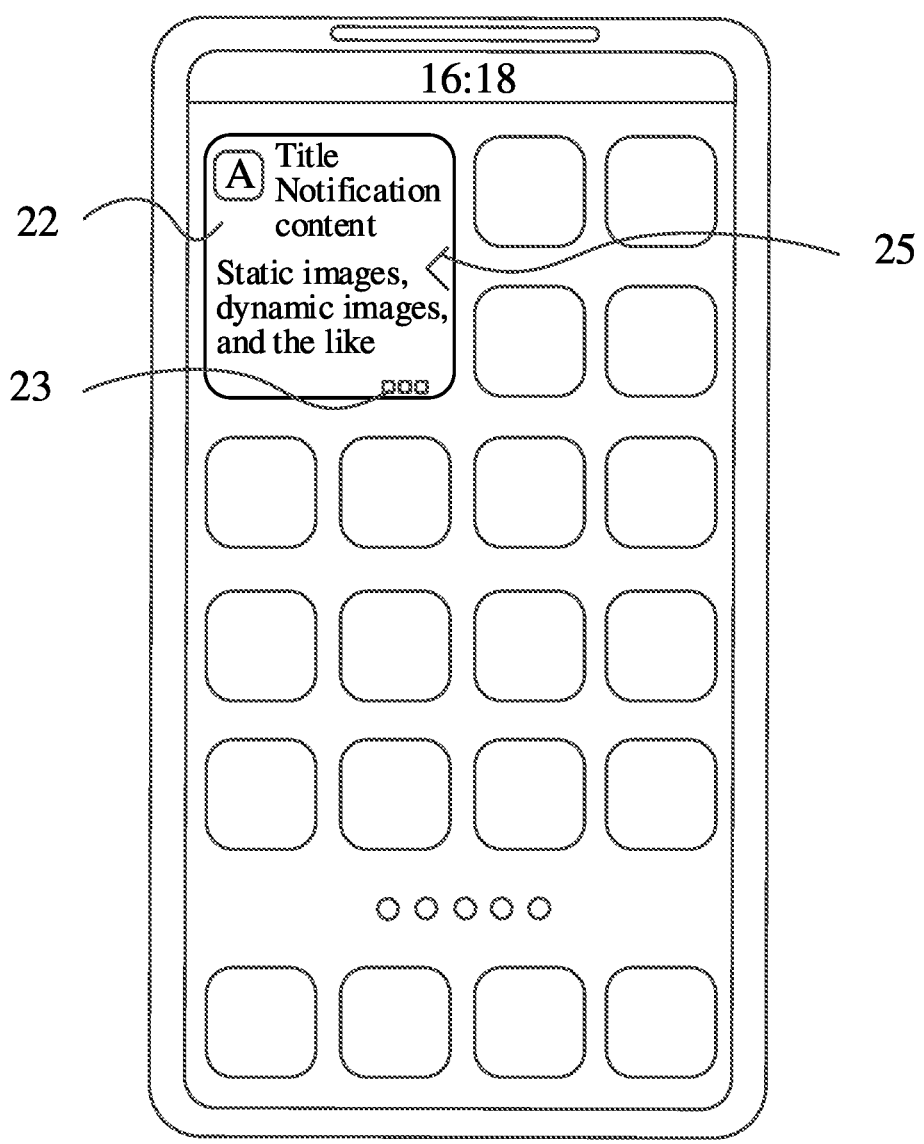
FIG. 2c is a schematic diagram 2 of displaying an application notification on a desktop according to an embodiment of this application.
Figure 2D:
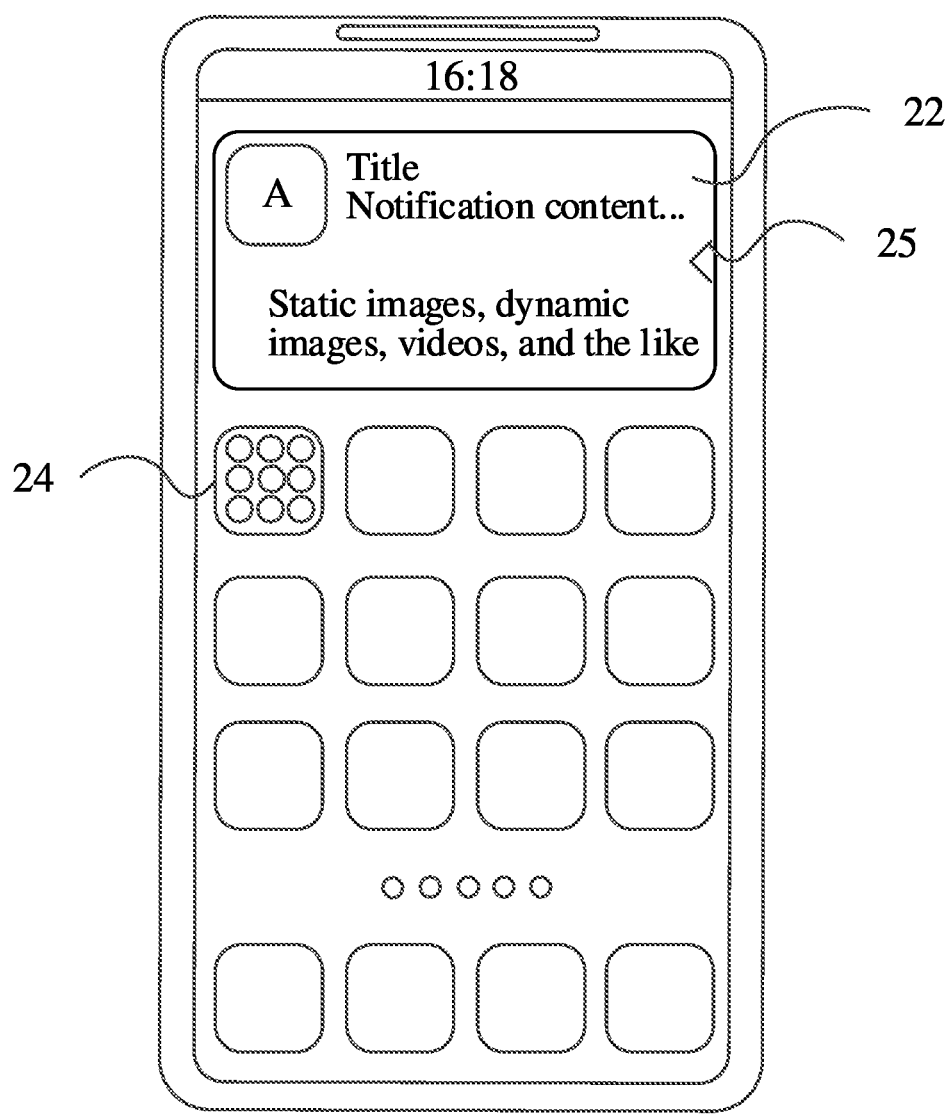
FIG. 2d is a schematic diagram 3 of displaying an application notification on a desktop according to an embodiment of this application.

For example, as shown in FIG. 2a, in a case that an electronic device 20 displays a desktop 21, if an application corresponding to an application icon A receives an application notification, it may be shown as FIG. 2b to FIG. 2d that the application notification is displayed by using a display region of a nearby icon at the application icon A, so that the application notification corresponding to the application icon A can be displayed in a third region 22.

The third region includes a display region of the first icon, and further includes a display region of N icons around the first icon, where N is an integer greater than or equal to 1.

In other words, the third region may include the display regions of the first icon and N second icons around the first icon on the desktop. In other words, the first notification may be displayed by occupying the display region of the N icons around the first icon. In this way, when the first notification is displayed, the first icon and the N second icons around the first icon at the position may not be displayed temporarily, for example, may be temporarily hidden or moved to another position on the desktop for display, to prioritize display of the first notification.

Optionally, in an implementation, display of the second icon may be canceled, that is, the second icon is temporarily not displayed during the display of the first notification, and display of the second icon is restored after the first notification is closed. In another implementation, the display position of the second icon may be updated, that is, the second icon may be moved to another position for display. For example, the second icon may be displayed near the third region, or moved to another page of the desktop for display.

A value of N may be determined by using a size of the third region. For example, when the size of the third region is 1×4 icons, the value of N may be 3, and when the size of the third region is 2×4 icons, the value of N may be 7, and so on.

In this way, by using a display region of a plurality of icons to display the application notification, it can be ensured that the notification display region has enough space to display specific content of the application notification, and it can be ensured that the notification display region is located near the application icon to which the application notification belongs.

It should be noted that in a case that a plurality of applications on the desktop receive notifications, whether to sequentially display the notifications of the applications or simultaneously display the notifications of the plurality of applications is determined according to display positions of application icons of the plurality of applications. For example, when the display positions of the application icons of the plurality of applications are close to each other, so that the notifications of the plurality of applications cannot be simultaneously displayed, the notifications of the applications may be sequentially displayed according to a sequence of receiving time of the notifications, that is, a notification of an application whose receiving time is earlier may be first displayed, and after the display of the application notification ends, a notification of a next application is displayed. When the display positions of the application icons of the plurality of applications are far from each other, and there is enough space for simultaneously displaying the notifications of the plurality of applications, a notification region may be displayed at a position of an application icon of the application, and a notification of the application is displayed in the notification region, respectively.

It should be noted that in this embodiment of this application, only in a case that the desktop is displayed, a function of displaying the application notification is enabled on the desktop, and the function is not enabled in a case that other pages are displayed.

In this embodiment of this application, the user can be supported to set whether to enable an application notification display function of a desktop application icon, that is, the user can choose whether to enable the application notification display function of the desktop application icon in the setting page according to requirements, and the process of this embodiment of this application is triggered only in the case that the function is enabled.

Optionally, the method further includes:
determining a size of the third region according to a type or a content length of the first notification in a case of receiving the first notification corresponding to the first application.

In other words, in an implementation, when the first notification is received, the size of the third region that displays the first notification may alternatively be determined adaptively according to the type of the first notification, or according to a quantity of content of the first notification. The application may select to push a text notification, a static image notification, a dynamic image notification, a video notification, or the like according to a type of a push notification, and different types of notifications require different sizes of display regions. For example, a text type notification requires a small display region, and an image type notification or a video type notification requires a large display region. Therefore, a correspondence between a notification type and a size of the display region may be preset, so that a corresponding size of the notification display region can be determined according to the notification type when the application notification is received.

Alternatively, a size of a currently required display region may be determined by an electronic device according to a content length of a current notification, so that the size of the notification region that can completely display the current notification is determined.

After the size of the notification display region is determined, a quantity and positions of second icons that need to be occupied may be determined according to the size of the notification display region, display of the second icon may be canceled or the display position of the second icon may be updated, and the third region is generated. The display position of the third region may be expanded from the display position of the first icon toward the periphery, for example, expanded rightward and downward, or expanded leftward and upward.

In this way, through this implementation, the size of the notification display region can be conveniently and quickly determined, and it is ensured that the notification can be completely displayed in the notification display region.

Optionally, that the display position of the second icon is updated includes:
creating a new folder at a target position, and moving the second icon into the folder, where the target position is close to the third region.

In other words, in an implementation, when it is determined that the display position of the second icon around the first icon needs to be occupied to display the first notification, the second icon may be temporarily accommodated in a new folder near the third region, that is, a new folder may be created at a position near the third region, and the second icon is moved into the folder. If there is a folder icon in the second icon, a blocked folder icon may also be moved into the new folder, that is, the new folder can support accommodating a folder icon. The user can open a blocked application from the new folder during folding of the application.

Figure 2E:
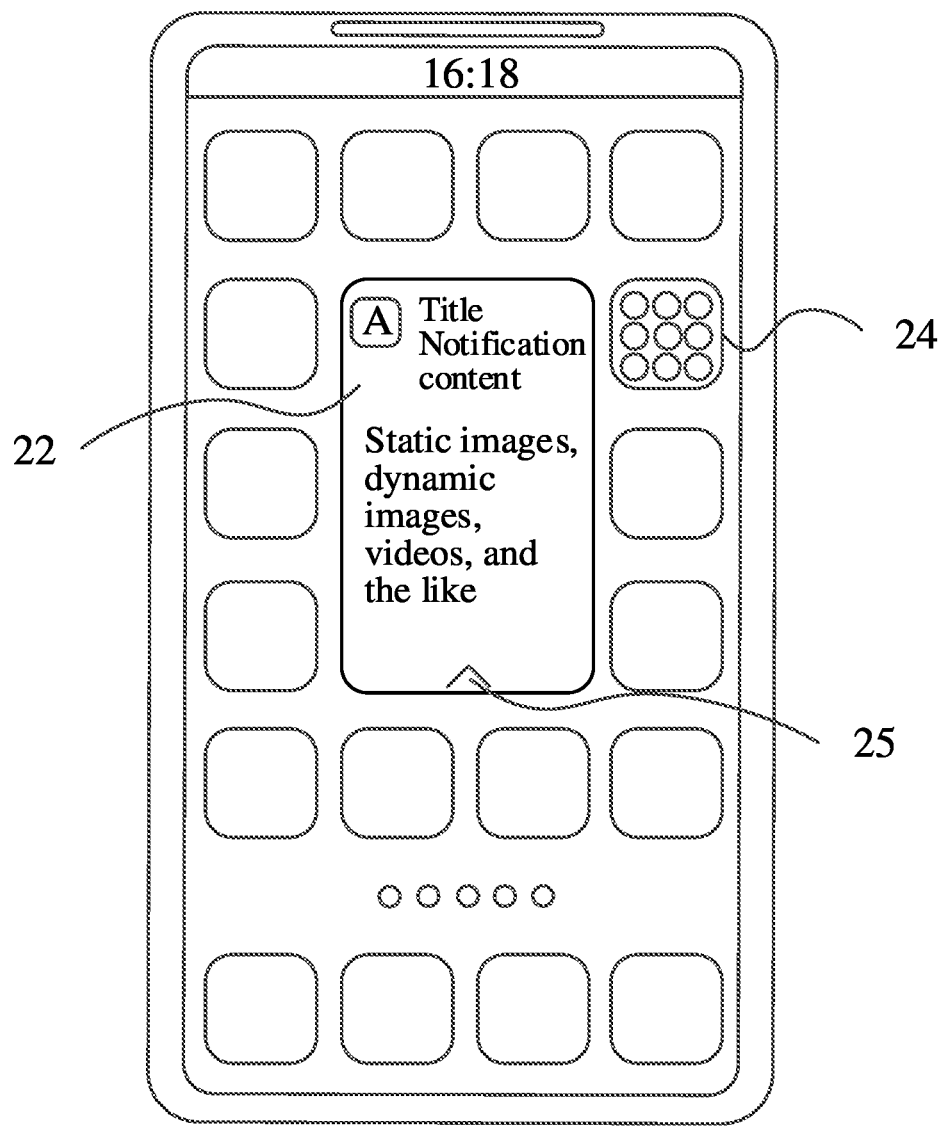
FIG. 2e is a schematic diagram 4 of displaying an application notification on a desktop according to an embodiment of this application.

For example, as shown in FIG. 2d, after the third region 22 is generated, a new folder 24 may be created at a position below the third region 22, seven application icons on a lower right side of the application icon A whose display region is occupied and an application icon originally located at a position of the new folder are moved into the new folder 24, and the application icon A and a corresponding static image, dynamic image, or video notification content thereof are displayed in the third region 22. As shown in FIG. 2e, after the third region 22 is displayed, a new folder 24 may be created at an upper-right position of the third region 22, five application icons on the lower right side of the application icon A whose display region is occupied and an application icon originally located at a position of the new folder are moved into the new folder 24, and the application icon A and a corresponding static image, dynamic image, or video notification content thereof are displayed in the third region 22.

In this way, in a case that a display region of another application icon is occupied to display the application notification, orderly display of desktop icons can be ensured by hiding or accommodating the occupied icons, to avoid disrupting display positions of other icons on the desktop.

Optionally, that the display of the second icon is canceled includes:
canceling display of the second icon, and displaying a thumbnail of the second icon at a preset position in the third region; and
after the first notification is displayed in a third region, the method further includes: receiving input for the third region; and
canceling display of the first notification in response to the input, and updating the thumbnail of the second icon to the second icon.

In another implementation, when it is determined that the display position of the second icon around the first icon needs to be occupied to display the first notification, the second icon may be temporarily hidden, that is, display of the second icon in the second region is canceled, and a thumbnail of the hidden second icon may be displayed at a position, such as a lower right corner, of a region in which the first notification is displayed, to notify the user of the currently hidden icon. A thumbnail in the third region may also support enlarged display after tapping by the user to facilitate a function that the user needs to tap the hidden application icon to enter a corresponding application interface.

For example, as shown in FIG. 2b, after the third region 22 is generated, three application icons on the right of the application icon A whose display region is occupied are hidden, thumbnails 23 of the hidden application icons are displayed at the lower right corner of the third region 22, and the application icon A and corresponding text notification content thereof are displayed at another position in the third region 22. Alternatively, as shown in FIG. 2b, after the third region 22 is displayed, three application icons on the lower right side of the application icon A whose display region is occupied are hidden, thumbnails 23 of the hidden application icons are displayed at the lower right corner of the third region 22, and the application icon A and corresponding static image or dynamic image notification content thereof are displayed at another position in the third region 22.

The foregoing two processing manners can support user pre-setting, that is, the user can select the processing manner of the blocked icons (that is, the icons occupied by the notification display region) after pre-enabling the application notification display function of the desktop icons on the setting page, such as selecting the manner of hiding or folding (that is, storing to a folder), so that after the notification region of the first application is displayed on the desktop, the second icons can be processed correspondingly according to the pre-setting of the user.

In addition, after viewing the first notification, or when the user does not need to view the first notification, the user may manually close the first notification, that is, the user may perform specific input on the third region, such as sliding input, or input of touching a close key in the third region. For example, as shown in FIG. 2b and FIG. 2c, the user may follow a left-indicated arrow 25 in the third region 22 and slide leftward from a position of the arrow 25 to trigger closing the first notification in the third region 22. After the first notification is closed, the display of the second icon may further be restored, for example, the thumbnail of the second icon is updated to the second icon.

It should be noted that in a case that the user does not manually close the first notification, the first notification may alternatively be automatically closed according to display duration of the first notification. Optionally, the first notification may be automatically closed in a case that the display duration of the first notification reaches specific duration, such as displaying for 10 s or 15 s. Certainly, in a case that the user switches to another page, for example, switches to a next desktop page, or enters an application interface, an event of automatically closing the first notification may be triggered.

In this way, in a case that a display region of another application icon is occupied to display the application notification, orderly display of desktop icons can be ensured by hiding the occupied icons, to avoid disrupting display positions of other icons on the desktop. In addition, through the manner of the user manually closing the notification or automatically closing the notification according to the notification display duration, a requirement of flexibly closing the application notification by the user can be satisfied, and neatness of the desktop can be ensured, preventing the application notification from occupying the desktop icons for a long time.

Optionally, after the first notification is displayed in a third region, the method further includes:

canceling the display of the first notification in a case that the first notification is marked as read, displaying the first icon in the first region, and displaying the second icon in the second region.

That the first notification is marked as read may be that the user manually marks the first notification as read after reading the first notification, or may be that the first notification is automatically marked as read after the first notification is displayed for specific duration.

In this implementation, in a case that the first notification is marked as read, display of the first notification may be canceled, that is, the first notification is closed, and the desktop is restored. In other words, display of the first icon in the first region is restored, and display of the second icon in the second region is restored. For a case that the second icon is hidden, hiding of the second icon may be canceled after the first notification is closed, enabling the second icon to be redisplayed at an original position. For a case that the second icon is accommodated in the new folder, after the first notification is closed, the new folder may be disassembled, and the second icon in the new folder is restored to being displayed at the original position.

In this way, by closing the application notification according to a read state of the application notification and restoring the application icons on the desktop, requirements of the user to normally operate icons can be ensured.

Implementations of this embodiment of this application are described below by using examples with reference to FIG. 2a to FIG. 2e and FIG. 3.

Figure 3:
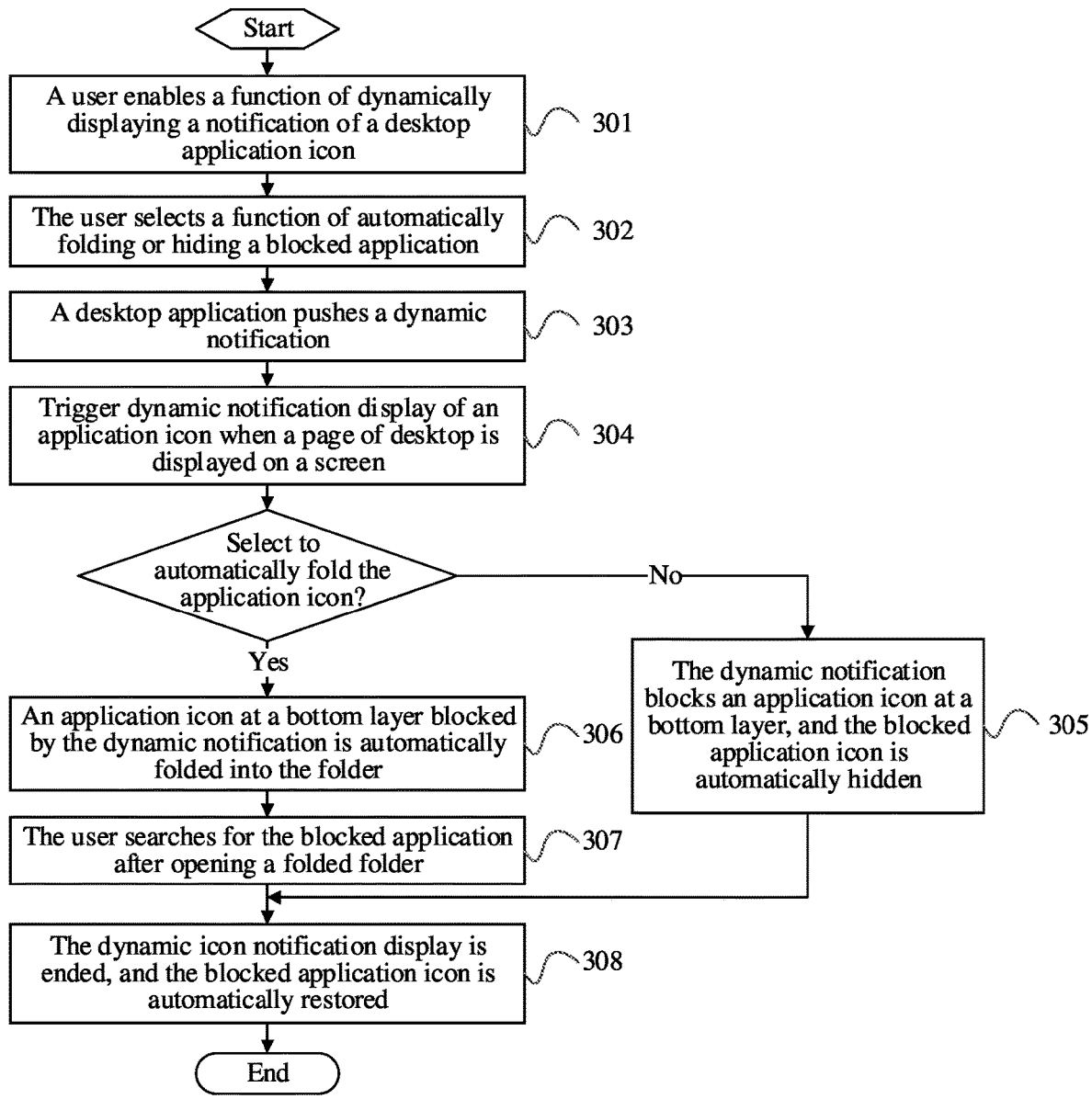
FIG. 3 is a flowchart of an example of an application notification display method according to an embodiment of this application.

As shown in FIG. 3, a dynamic notification display method for a desktop application icon may include the following steps.

Step 301: The user enables a function of dynamically displaying a notification of a desktop application icon.

Step 302: The user selects a function of automatically folding or hiding the blocked application.

As shown in FIG. 2a to FIG. 2e, FIG. 2a shows an effect when there is no notification, and the desktop is normally displayed; FIG. 2b and FIG. 2c show an effect that the user selects to automatically hide the blocked application, and an application icon blocked by an enlarged dynamic notification only displays the thumbnail 23 at the lower right corner at a notification display stage; and FIG. 2d and FIG. 2e show an effect that the user selects to automatically fold the blocked application, and the application icon blocked by the enlarged dynamic notification is automatically folded into a near folder at the notification display stage.

Step 303: The desktop application pushes a dynamic notification.

The desktop application may select pushing a text notification, a static image notification, a dynamic image notification, a video notification, and the like according to different types of push messages. The desktop automatically adjusts a size of an application icon according to the type of the notification pushed by the application.

Step 304: Trigger dynamic notification display of an application icon when a page of desktop is displayed on a screen.

The dynamic notification of the desktop application icon is only triggered when the desktop page is displayed, for example, only really triggered when the desktop page is entered after unlocking, and the desktop is slid to the desktop page, and the desktop may only display the dynamic notification of one application icon at the same time. If the user selects the function of automatically folding the blocked application, step 306 is performed, or otherwise, step 305 is performed.

Step 305: The dynamic notification blocks an application icon at a bottom layer, and the blocked application icon is automatically hidden.

FIG. 2b and FIG. 2c show the effect that the user selects to automatically hide the blocked application, and an application icon blocked by an enlarged dynamic notification displays the thumbnail 23 of the icon at the lower right corner of an enlarged third region 22 at the notification display stage. The user may slide the dynamic notification leftward by a finger to close the dynamic notification and reopen the hidden application icon, and after the notification display ends, the blocked application icon is automatically restored. Next, step 308 is performed.

Step 306: The application icon at the bottom layer blocked by the dynamic notification is automatically folded into the folder.

FIG. 2d and FIG. 2e show the effect that the user selects to automatically fold the blocked application, and the application icon blocked by the enlarged dynamic notification is automatically folded into the folder 24 at the notification stage. The folder 24 is located close to the enlarged third region 22. The user may open a blocked application after opening the folder 24 during folding of the application icon. If there is a folder icon in a blocked region, the folder icon is also added in the blocked folder 24, and after the notification display ends, the blocked application icon is automatically restored.

Step 307: The user searches for the blocked application after opening the folded folder.

Step 308: The dynamic icon notification display ends, and the blocked application icon is automatically restored.

According to the different types of the dynamic notifications of the application icon, the display duration of the notification may be different, for example, the display duration of the text notification is 10 seconds. After the display duration ends, the notification automatically ends, and the blocked application icon is automatically restored. The user may manually slide to close the notification at the notification display stage, or switch to the next page of the desktop, open an application, and perform other operations, and the notification display automatically ends.

According to this embodiment of this application, after enabling the function of dynamically displaying a notification of a desktop icon, the user can view more types of application push notifications, such as the dynamic image notification and the video notification. The terminal desktop of the user is not a desktop that singly displays icons, but a desktop with constant dynamic information, and notifies the user of a new notification in a weak notification manner, resolving a defect that the existing application notification method cannot display detailed content or frequently notifies and disturbs the user, and improving user experience of viewing notifications and using the terminal desktop.

According to the application notification display method in this embodiment of this application, the first icon is displayed in the first region; the second icon is displayed in the second region, where the first region is close to the second region; and the display position of the second icon is updated or the display of the second icon is canceled in a case of receiving the first notification corresponding to the first application, the first notification is displayed in the third region, where the third region includes the first region and the second region, where the first icon corresponds to the first application. In this way, the notification of the application is displayed at the display position of the application icon, a user can directly read notification content of the application, thereby improving the desktop notification display effect of the application.

It should be noted that the application notification display method provided in this embodiment of this application may be performed by an application notification display apparatus, or a control module configured to perform the application notification display method in the application notification display apparatus. This embodiment of this application describes an application notification display apparatus provided in an embodiment of this application by using an example in which the application notification display apparatus performs the application notification display method.

Figure 4:
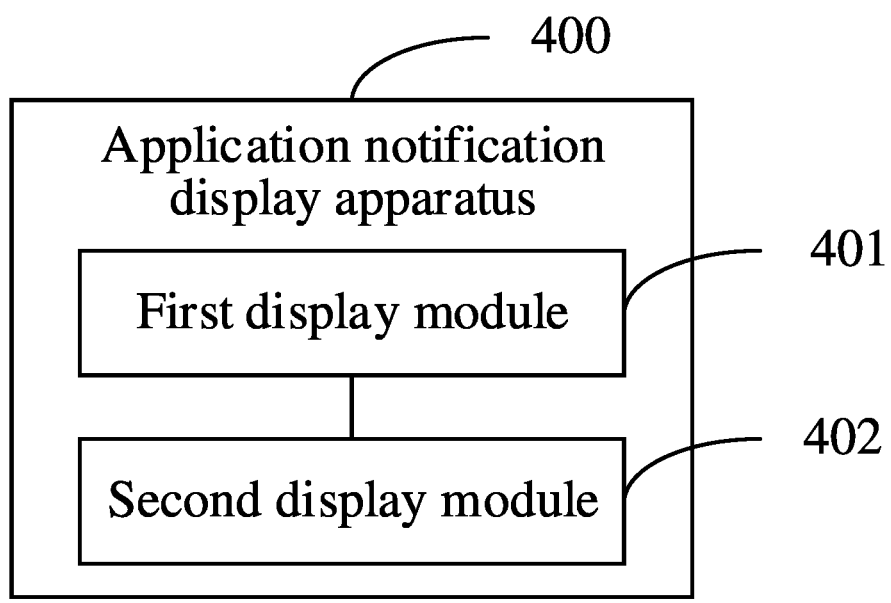
FIG. 4 is a schematic structural diagram of an application notification display apparatus according to an embodiment of this application.

Refer to FIG. 4. FIG. 4 is a schematic structural diagram of an application notification display apparatus according to an embodiment of this application. As shown in FIG. 4, the application notification display apparatus 400 includes:

a first display module 401, configured to display a first icon in a first region, and display a second icon in a second region, where the first region is close to the second region; and a second display module 402, configured to update a display position of the second icon or cancel display of the second icon in a case of receiving a first notification corresponding to a first application, and display the first notification in a third region, where the third region includes the first region and the second region, where the first icon corresponds to the first application.

Optionally, the application notification display apparatus 400 further includes:

a determining module, configured to determine a size of the third region according to a type or a content length of the first notification in a case of receiving the first notification corresponding to the first application.

Optionally, the second display module 402 is configured to create a new folder at a target position, and move the second icon into the folder, where the target position is close to the third region.

Optionally, the second display module 402 is configured to cancel display of the second icon, and display a thumbnail of the second icon at a preset position in the third region; and the application notification display apparatus 400 further includes:

a receiving module, configured to receive input for the third region; and a third display module, configured to cancel display of the first notification in response to the input, and update the thumbnail of the second icon to the second icon.

Optionally, the application notification display apparatus 400 further includes:

a fourth display module, configured to cancel the display of the first notification in a case that the first notification is marked as read, display the first icon in the first region, and display the second icon in the second region.

By using the application notification display apparatus in this embodiment of this application, the first icon is displayed in the first region; the second icon is displayed in the second region; the first region is close to the second region; and the display position of the second icon is updated or display of the second icon is canceled in a case of receiving the first notification corresponding to the first application, the first notification is displayed in the third region, where the third region includes the first region and the second region, where the first icon corresponds to the first application. In this way, the notification of the application is displayed at the display position of the application icon, a user can directly read notification content of the application, thereby improving the desktop notification display effect of the application.

The application notification display apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, a personal digital assistant (PDA), or the like, and the non-mobile electronic device may be a server, a network attached storage (NAS), a personal computer (PC), a television (TV), a teller machine, an automated machine, or the like, which are not specifically limited in this embodiment of this application.

The application notification display apparatus in this embodiment of this application may be an apparatus having an operating system. The operating system may be an Android operating system, may be an ios operating system, or may be another possible operating system, which is not specifically limited in this embodiment of this application.

The application notification display apparatus provided in this embodiment of this application can implement processes implemented in the method embodiments of FIG. 1 to FIG. 3, and to avoid repetition, details are not described herein again.

Figure 5:
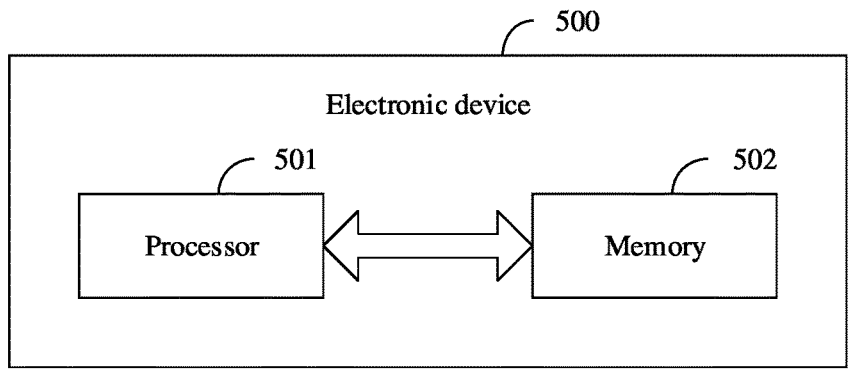
FIG. 5 is a schematic structural diagram of an electronic device according to an embodiment of this application.

Optionally, as shown in FIG. 5, an embodiment of this application further provides an electronic device 500, including a processor 501, a memory 502, a program or instructions stored in the memory 502 and runnable on the processor 501, the program or the instructions, when executed by the processor 501, implementing processes of embodiments of the application notification display method, and the same technical effect can be achieved. To avoid repetition, details are not described herein again.

It should be noted that the electronic device in this embodiment of this application includes the foregoing mobile electronic device and non-mobile electronic device.

Figure 6:
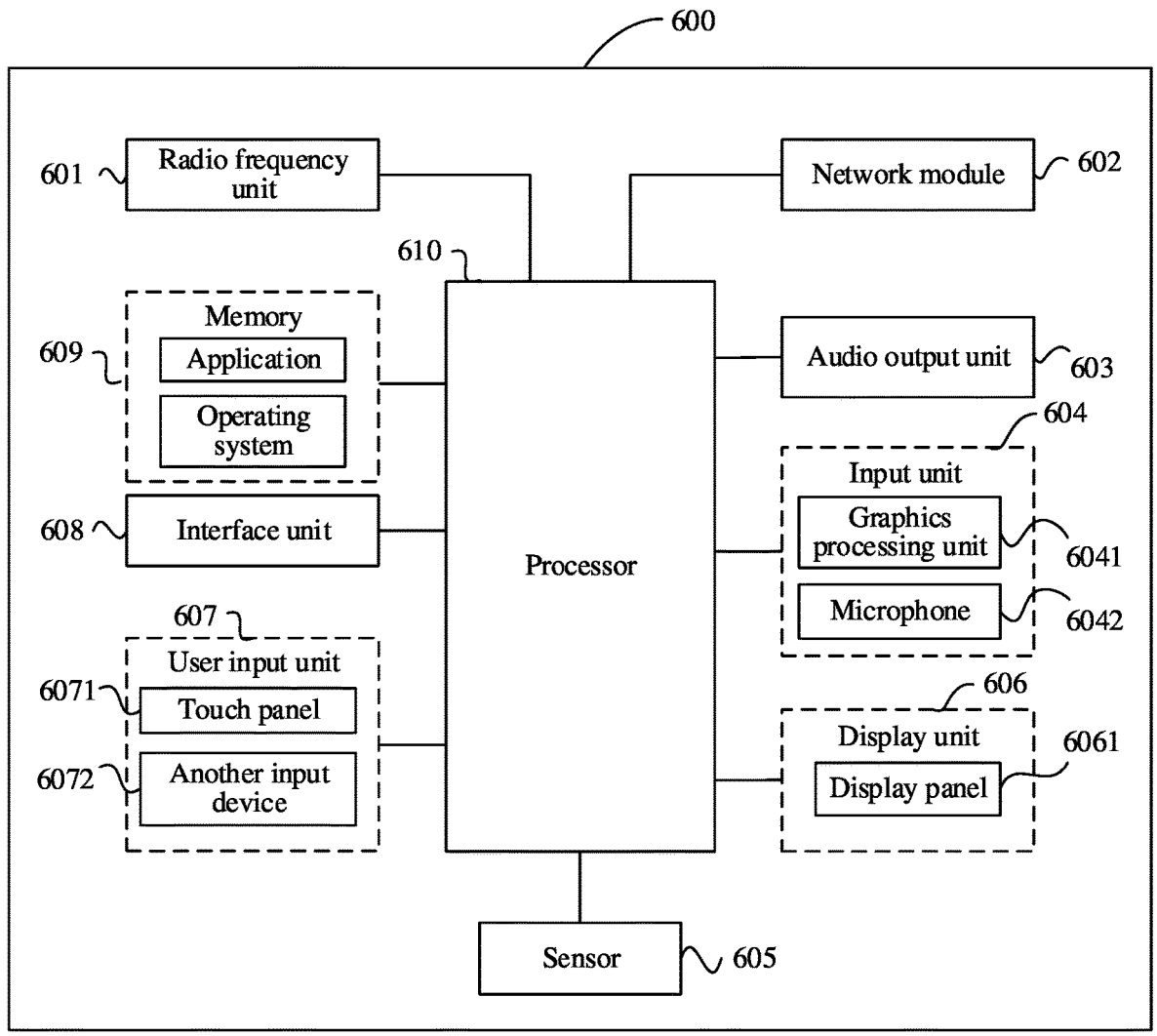
FIG. 6 is a schematic structural diagram of hardware of an electronic device according to an embodiment of this application.

FIG. 6 is a schematic structural diagram of hardware of an electronic device implementing the embodiments of this application.

The electronic device 600 includes, but is not limited to, components such as a radio frequency unit 601, a network module 602, an audio output unit 603, an input unit 604, a sensor 605, a display unit 606, a user input unit 607, an interface unit 608, a memory 609, and a processor 610.

A person skilled in the art may understand that the electronic device 600 may further include a power supply (such as a battery) for supplying power to the components. The power supply may be logically connected to the processor 610 by using a power management system, thereby implementing functions, such as charging, discharging, and power consumption management, by using the power management system. The structure of the electronic device shown in FIG. 6 constitutes no limitation on the electronic device, and the electronic device may include more or fewer components than those shown in the figure, or some components may be combined, or a different component deployment may be used, which is not described herein again.

The display unit 606 is configured to display a first icon in a first region; display a second icon in a second region, where the first region is close to the second region; and
    the display position of the second icon is updated or display of the second icon is canceled in a case of receiving the first notification corresponding to the first application, the first notification is displayed in the third region, where the third region includes the first region and the second region, where
  the first icon corresponds to the first application.

Optionally, the processor 610 is configured to determine a size of the third region according to a type or a content length of the first notification in a case of receiving the first notification corresponding to the first application.

Optionally, the processor 610 is further configured to create a new folder at a target position, and move the second icon into the folder, where the target position is close to the third region.

Optionally, the second display unit 606 is further configured to cancel display of the second icon, and display a thumbnail of the second icon at a preset position in the third region; and
    the user input unit 607 is configured to receive input for the third region; and
    the display unit 606 is further configured to cancel display of the first notification in response to the input, and update the thumbnail of the second icon to the second icon.

Optionally, the display unit 606 is further configured to cancel display of the first notification in a case that the first notification is marked as read, display the first icon in the first region, and display the second icon in the second region.

By using the electronic device in this embodiment of this application, the first icon is displayed in the first region; the second icon is displayed in the second region; the first region is close to the second region; and the display position of the second icon is updated or the display of the second icon is canceled in a case of receiving the first notification corresponding to the first application, the first notification is displayed in the third region, where the third region includes the first region and the second region, where the first icon corresponds to the first application. In this way, the notification of the application is displayed at the display position of the application icon, a user can directly read notification content of the application, thereby improving the desktop notification display effect of the application.

It should be noted that in this embodiment of this application, the input unit 604 may include a graphics processing unit (GPU) 6041 and a microphone 6042. The graphics processing unit 6041 performs processing on image data of a static picture or a video that is obtained by an image acquisition device (for example, a camera) in a video acquisition mode or an image acquisition mode. The display unit 606 may include a display panel 6061, and the display panel 6061 may be configured by using a liquid crystal display, organic light-emitting diode, or the like. The user input unit 607 includes a touch panel 6071 and another input device 6072. The touch panel 6071 is also referred to as a touch screen. The touch panel 6071 may include two parts: a touch detection apparatus and a touch controller. The another input device 6072 may include, but is not limited to, a physical keyboard, a functional key (such as a volume control key or a switch key), a track ball, a mouse, and a joystick, which are not described herein again. The memory 609 may be configured to store a software program and various data, which includes, but is not limited to, an application and an operating system. The processor 610 may integrate an application processor and a modem. The application processor mainly processes an operating system, a user interface, an application, and the like. The modem mainly processes wireless communication. It may be understood that, the modem may alternatively not be integrated in the processor 610.

An embodiment of this application further provides a readable storage medium. The readable storage medium stores a program or instructions, the program or the instructions, when executed by a processor, implementing processes of embodiments of the application notification display method, and the same technical effects can be achieved. To avoid repetition, details are not described herein again.

The processor is the processor in the electronic device in the foregoing embodiment. The readable storage medium includes a computer-readable storage medium, such as a computer read-only memory (ROM), a random access memory (RAM), a magnetic disk, an optical disc, or the like.

An embodiment of this application further provides a chip. The chip includes a processor and a communication interface. The communication interface is coupled to the processor. The processor is configured to run a program or instructions, to implement processes of embodiments of the application notification display method, and the same technical effects can be achieved. To avoid repetition, details are not described herein again.

It should be understood that the chip provided in this embodiment of this application may also be referred to as a system-level chip, a system chip, a chip system, a system on chip, or the like.

It should be noted that terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the method and apparatus in the embodiments of this application is not limited to performing the functions in the order shown or discussed, but may also include performing the functions in a substantially simultaneous manner or in reverse order according to the functions involved, for example, the described method may be performed in a different order than described, and various steps may be added, omitted, or combined. In addition, features described with reference to some examples may be combined in other examples.

Through the descriptions of the foregoing implementations, a person skilled in the art may clearly understand that the method in the foregoing embodiments may be implemented by using software and a necessary general hardware platform, and certainly, may alternatively be implemented by hardware, but in many cases, the former manner is a better implementation. Based on such an understanding, the technical solutions of this application essentially or the part contributing to the related art may be implemented in a form of a computer software product. The computer software product is stored in a storage medium (such as a ROM/RAM, a magnetic disk, or an optical disc) and includes several instructions for instructing a terminal (which may be a mobile phone, a computer, a server, a network device, or the like) to perform the methods described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

INDUSTRIAL APPLICABILITY

According to the embodiments of this application, the first icon is displayed in the first region; the second icon is displayed in the second region; the first region is close to the second region; and the display position of the second icon is updated or the display of the second icon is canceled in a case of receiving the first notification corresponding to the first application, the first notification is displayed in the third region, where the third region includes the first region and the second region, where the first icon corresponds to the first application. In this way, the notification of the application is displayed at the display position of the application icon, a user can directly read notification content of the application, thereby improving the desktop notification display effect of the application.

What is claimed is:

1. An application notification display method, comprising:

displaying a first icon in a first region; and displaying a second icon in a second region, wherein the first region is close to the second region; and updating a display position of the second icon or canceling display of the second icon in a case of receiving a first notification corresponding to a first application, and displaying the first notification in a third region, wherein the third region comprises the first region and the second region, wherein the first icon corresponds to the first application;

wherein the canceling display of the second icon comprises:

canceling display of the second icon, and displaying a thumbnail of the second icon at a preset position in the third region; and after the displaying the first notification in a third region, the method further comprises: receiving input for the third region; and canceling display of the first notification in response to the input, and updating the thumbnail of the second icon to the second icon.

2. The method according to claim 1, wherein the method further comprises:

determining a size of the third region according to a type or a content length of the first notification in a case of receiving the first notification corresponding to the first application.

3. The method according to claim 1, wherein the updating a display position of the second icon comprises:

creating a new folder at a target position, and moving the second icon into the folder, wherein the target position is close to the third region.

4. The method according to claim 1, wherein after the displaying the first notification in a third region, the method further comprises:

canceling display of the first notification in a case that the first notification is marked as read, displaying the first icon in the first region, and displaying the second icon in the second region.

5. A chip, wherein the chip comprises a processor and a communication interface, the communication interface is coupled to the processor, and the processor is configured to run a program or instructions, to implement the application notification display method according to claim 1.

6. An electronic device, comprising a processor, a memory, and a program or instructions stored in the memory and runnable on the processor, wherein the program or the instructions, when executed by the processor, causes the electronic device to perform:

displaying a first icon in a first region; and displaying a second icon in a second region, wherein the first region is close to the second region; and updating a display position of the second icon or canceling display of the second icon in a case of receiving a first notification corresponding to a first application, and displaying the first notification in a third region, wherein the third region comprises the first region and the second region, wherein the first icon corresponds to the first application;

wherein when canceling display of the second icon, the program or the instruction, when executed by the processor, causes the electronic device to perform:

canceling display of the second icon, and displaying a thumbnail of the second icon at a preset position in the third region; and after the displaying the first notification in a third region, the program or the instruction, when executed by the processor, causes the electronic device to further perform: receiving input for the third region; and canceling display of the first notification in response to the input, and updating the thumbnail of the second icon to the second icon.

7. The electronic device according to claim 6, wherein the program or the instruction, when executed by the processor, causes the electronic device to further perform:
   determining a size of the third region according to a type or a content length of the first notification in a case of receiving the first notification corresponding to the first application.

8. The electronic device according to claim 6, wherein when updating a display position of the second icon, the program or the instruction, when executed by the processor, causes the electronic device to perform:
   creating a new folder at a target position, and moving the second icon into the folder, wherein the target position is close to the third region.

9. The electronic device according to claim 6, wherein after the displaying the first notification in a third region, the program or the instruction, when executed by the processor, causes the electronic device to further perform:
   canceling display of the first notification in a case that the first notification is marked as read, displaying the first icon in the first region, and displaying the second icon in the second region.

10. A non-transitory readable storage medium, storing a program or instructions, wherein the program or the instructions, when executed by a processor, causes the processor to perform:
    displaying a first icon in a first region; and displaying a second icon in a second region, wherein the first region is close to the second region; and
    updating a display position of the second icon or canceling display of the second icon in a case of receiving a first notification corresponding to a first application, and displaying the first notification in a third region, wherein the third region comprises the first region and the second region, wherein
    the first icon corresponds to the first application;
    wherein when canceling display of the second icon, the program or the instruction, when executed by the processor, causes the processor to perform:
    canceling display of the second icon, and displaying a thumbnail of the second icon at a preset position in the third region; and
    after the displaying the first notification in a third region, the program or the instruction, when executed by the processor, causes the processor to further perform:
    receiving input for the third region; and
    canceling display of the first notification in response to the input, and updating the thumbnail of the second icon to the second icon.

11. The non-transitory readable storage medium according to claim 10, wherein the program or the instruction, when executed by the processor, causes the processor to further perform:
    determining a size of the third region according to a type or a content length of the first notification in a case of receiving the first notification corresponding to the first application.

12. The non-transitory readable storage medium according to claim 10, wherein when updating a display position of the second icon, the program or the instruction, when executed by the processor, causes the processor to perform:
    creating a new folder at a target position, and moving the second icon into the folder, wherein the target position is close to the third region.

13. The non-transitory readable storage medium according to claim 10, wherein after the displaying the first notification in a third region, the program or the instruction, when executed by the processor, causes the processor to further perform:
    canceling display of the first notification in a case that the first notification is marked as read, displaying the first icon in the first region, and displaying the second icon in the second region.

* * * * *